United States Patent
Pillans

(10) Patent No.: US 8,523,427 B2
(45) Date of Patent: Sep. 3, 2013

(54) SENSOR DEVICE WITH IMPROVED SENSITIVITY TO TEMPERATURE VARIATION IN A SEMICONDUCTOR SUBSTRATE

(75) Inventor: Luke Alexander Pillans, Newbury (GB)

(73) Assignee: Analog Devices, Inc., Norwood, MA (US)

( * ) Notice: Subject to any disclaimer, the term of this patent is extended or adjusted under 35 U.S.C. 154(b) by 931 days.

(21) Appl. No.: 12/072,526

(22) Filed: Feb. 27, 2008

(65) Prior Publication Data

US 2009/0213895 A1  Aug. 27, 2009

(51) Int. Cl.
*G01K 15/00* (2006.01)
*G01K 17/06* (2006.01)
*G01K 3/06* (2006.01)
*G01J 5/02* (2006.01)

(52) U.S. Cl.
USPC ........... 374/129; 374/178; 374/137; 374/124; 374/167; 374/1; 250/338.1; 702/99

(58) Field of Classification Search
USPC ............. 374/1, 2, 5, 10, 29, 30, 43, 100, 111, 374/112, 113, 115, 110, 141, 120, 121, 129, 374/137, 163, 166, 167, 124, 178; 702/99, 702/130; 438/14, 16, 907, 909, 935; 250/338.1, 346, 349; 356/43
See application file for complete search history.

(56) References Cited

U.S. PATENT DOCUMENTS

| | | | |
|---|---|---|---|
| 4,286,225 A | 8/1981 | Morong, III | |
| 4,360,784 A | 11/1982 | Bartlett | |
| 4,682,030 A | 7/1987 | Rose et al. | |
| 4,994,664 A | 2/1991 | Veldkamp | |
| 5,034,608 A | 7/1991 | Tavrow et al. | |
| 5,210,400 A | 5/1993 | Usami | |
| 5,236,170 A * | 8/1993 | Johnsen | 248/578 |
| 5,255,286 A * | 10/1993 | Moslehi et al. | 374/121 |
| 5,265,957 A * | 11/1993 | Moslehi et al. | 374/1 |
| 5,326,171 A * | 7/1994 | Thompson et al. | 374/121 |
| 5,528,038 A | 6/1996 | Yoshiike et al. | |

(Continued)

FOREIGN PATENT DOCUMENTS

| | | |
|---|---|---|
| DE | 10 2004 031315 | 4/2005 |
| EP | 0646972 | 4/1995 |

(Continued)

OTHER PUBLICATIONS

International Search Report dated Sep. 3, 2010, received in International Application No. PCT/EP2009/052204.

(Continued)

*Primary Examiner* — Gail Verbitsky

(74) *Attorney, Agent, or Firm* — Knobbe Martens Olson & Bear LLP

(57) ABSTRACT

A sensor device formed on a semiconductor substrate. The device comprises a thermal radiation sensor including a sensing cell and a referencing cell which are co-operable for providing a first output signal indicative of the temperature fluctuation resulting from incident radiation. A gradient sensor including a pair of cells spatially located on the semiconductor substrate is provided which are co-operable to provide a second output signal indicative of the temperature gradient across the semiconductor substrate for facilitating calibrating the first output signal. At least one of the cells of the gradient sensor is not common to the cells of the thermal radiation sensor.

28 Claims, 4 Drawing Sheets

(56) References Cited

U.S. PATENT DOCUMENTS

| | | | |
|---|---|---|---|
| 5,550,373 | A | 8/1996 | Cole et al. |
| 5,553,939 | A * | 9/1996 | Dilhac et al. .................... 374/1 |
| 5,567,942 | A | 10/1996 | Lee et al. |
| 5,650,624 | A | 7/1997 | Wong |
| 5,668,033 | A | 9/1997 | Ohara et al. |
| 5,701,008 | A | 12/1997 | Ray et al. |
| 5,718,511 | A * | 2/1998 | Mundt .......................... 374/137 |
| 5,721,430 | A | 2/1998 | Wong |
| 5,754,088 | A | 5/1998 | Fletcher et al. |
| 5,914,488 | A | 6/1999 | Sone |
| 5,962,854 | A * | 10/1999 | Endo ............................. 250/349 |
| 5,971,608 | A * | 10/1999 | Koizumi .......................... 374/5 |
| 6,038,065 | A | 3/2000 | Borden |
| 6,048,092 | A | 4/2000 | Kimura et al. |
| 6,106,148 | A * | 8/2000 | Moslehi et al. ................... 374/1 |
| 6,191,399 | B1 * | 2/2001 | Van Bilsen .................... 219/497 |
| 6,215,816 | B1 | 4/2001 | Gillespie et al. |
| 6,222,454 | B1 | 4/2001 | Harling et al. |
| 6,249,171 | B1 | 6/2001 | Yaklin et al. |
| 6,252,229 | B1 | 6/2001 | Hays et al. |
| 6,325,536 | B1 * | 12/2001 | Renken et al. ................. 374/161 |
| 6,359,276 | B1 | 3/2002 | Tu |
| 6,392,232 | B1 | 5/2002 | Gooch et al. |
| 6,460,411 | B1 | 10/2002 | Kersjes et al. |
| 6,504,155 | B1 | 1/2003 | Ookawa |
| 6,603,101 | B2 * | 8/2003 | Hayasaki et al. .............. 219/502 |
| 6,616,332 | B1 * | 9/2003 | Renken et al. ................. 374/162 |
| 6,703,592 | B2 * | 3/2004 | Van Bilsen .................... 219/497 |
| 6,815,235 | B1 * | 11/2004 | Markle ............................ 438/16 |
| 6,965,107 | B2 | 11/2005 | Komobuchi et al. |
| 7,064,442 | B1 | 6/2006 | Lane et al. |
| 7,079,669 | B2 | 7/2006 | Hashimoto et al. |
| 7,326,932 | B2 | 2/2008 | Hynes et al. |
| 7,419,299 | B2 * | 9/2008 | Akram et al. .................. 374/137 |
| 7,435,964 | B2 | 10/2008 | Lane et al. |
| 7,578,616 | B2 * | 8/2009 | Gaff et al. ...................... 374/161 |
| 7,692,148 | B2 * | 4/2010 | Lane et al. .................... 250/338.1 |
| 7,718,967 | B2 * | 5/2010 | Lane et al. ................... 250/339.03 |
| 2001/0035559 | A1 | 11/2001 | Ando et al. |
| 2002/0175284 | A1 | 11/2002 | Vilain |
| 2002/0191819 | A1 | 12/2002 | Hashimoto et al. |
| 2003/0075794 | A1 | 4/2003 | Felton et al. |
| 2003/0203517 | A1 * | 10/2003 | Suzuki et al. ..................... 438/14 |
| 2003/0209893 | A1 | 11/2003 | Breed et al. |
| 2003/0213910 | A1 | 11/2003 | Anderson et al. |
| 2004/0173751 | A1 | 9/2004 | Komobuchi et al. |
| 2005/0218327 | A1 | 10/2005 | Uchida et al. |
| 2005/0258367 | A1 * | 11/2005 | Anderson et al. .......... 250/338.1 |
| 2006/0091300 | A1 | 5/2006 | Nishimura |
| 2006/0163453 | A1 | 7/2006 | Hynes et al. |
| 2007/0108388 | A1 | 5/2007 | Lane et al. |
| 2007/0120060 | A1 | 5/2007 | Lane et al. |
| 2007/0138394 | A1 | 6/2007 | Lane et al. |
| 2007/0138395 | A1 | 6/2007 | Lane et al. |
| 2008/0061237 | A1 | 3/2008 | Franz et al. |
| 2008/0164415 | A1 | 7/2008 | Kierse et al. |
| 2008/0202209 | A1 * | 8/2008 | Lambkin et al. .............. 73/31.05 |

FOREIGN PATENT DOCUMENTS

| | | |
|---|---|---|
| JP | 63175466 A * | 7/1988 |
| JP | 07092026 | 4/1995 |
| JP | 08145787 | 6/1996 |
| JP | 08261835 | 10/1996 |
| JP | 09264791 A * | 10/1997 |
| JP | 2000338389 | 12/2000 |
| WO | WO 00/03215 | 1/2000 |
| WO | WO 01/09579 | 2/2001 |
| WO | WO 2006/079588 | 8/2006 |

OTHER PUBLICATIONS

International Preliminary Report on Patentability dated Sep. 10, 2010 received in International Application No. PCT/EP2009/052204.

Mori, T. et al., Vaccum-encapsulated thermistor bolometer type miniature infrared sensor, IEE, Jan. 1994, pp. 257-262.

International Preliminary Report on Patentability dated Aug. 26, 2010 in International Application No. PCT/EP2009/051506.

International Search Report and Written Opinion from corresponding International Application No. PCT/EP2009/051506 mailed Jul. 6, 2009.

International Search Report and Written Opinion in International Application No. PCT/EP2007/061091 dated Jan. 4, 2008.

International Search Report and Written Opinion in International Application No. PCT/EP2007/061093 dated Jan. 29, 2008.

International Search Report and Written Opinion in International Application No. PCT/EP2007/061099 dated Feb. 12, 2008.

International Search Report in International Application No. PCT/EP2006/050174, Apr. 13, 2006.

* cited by examiner

SENSOR DEVICE WITH IMPROVED SENSITIVITY TO TEMPERATURE VARIATION IN A SEMICONDUCTOR SUBSTRATE

FIELD OF THE INVENTION

The application relates to a sensor device with improved sensitivity to temperature variation in the semiconductor substrate. The application more particularly relates to a sensor device including a thermal radiation sensor and a gradient sensor.

BACKGROUND

Thermal radiation sensors are well known in the art. When formed in a semiconductor material such as silicon or germanium such sensors may be provided as mechanical structures, for example as a micro electromechanical (MEMS) arrangement, or electromagnetic (EM) radiation sensors such as infra-red (IR) sensors. By using materials such as semiconductors, it is possible to form sensors in one or more layers of the substrate from etching and other semiconductor processing techniques so as to result in a desired configuration. Due to the delicate nature of the sensors and their sensitivity to the surrounding environment it is known to provide a protective cap over the sensor, the cap serving to isolate the environment of the sensor from the ambient environment where the sensor is operable. Examples of such structures are provided in U.S. patent application Ser. Nos. 11/584,466, 11/584,733, 11/584,725, 11/584,121, and 11/045,910 which are co-assigned to the Assignee of the present application Thermal radiation sensors of the type incorporating resistors operate by measuring the impedance difference between the illuminated resistors and the shielded resistors to calculate the heating caused by incident infrared radiation. Each of the resistors are provided on a substrate and are characterised by having a predetermined Temperature Coefficient of Resistance (TCR). In operation, some of the resistors are illuminated by infrared radiation while others remain shielded from infrared radiation. The temperature of the target is inferred from the difference in the temperature between the illuminated and shielded resistors. The shielded and un-shielded resistors are spatially separated on the substrate, typically a substrate formed from a semiconductor material, and it will therefore be understood that the output of the sensor is taken from measurements at two different locations. While it is possible to assume that the base substrate temperature is of negligible influence, this assumption does not always hold—especially applications requiring high sensitivity. Thermal radiation sensors known heretofore are extremely sensitive to both temperature gradients over spatial distance in semiconductor substrate and to temperature drift over time. In this context and within the present disclosure temperature gradient effects are related to differences in the measured temperature at two spatially separated locations on a substrate. Temperature drift in contrast and within the context of the present disclosure is intended to relate to the result of thermal impedance between the thermal radiation sensor and the semiconductor substrate on which the sensor is located, the thermal impedance introducing a characteristic time lag into the sensor's response to temperature changes in the substrate. This thermal drift sensitivity has an associated time constant, so computational correction requires a parametric model or a lookup table with linear interpolation between points.

As described in co-assigned U.S. patent application Ser. Nos. 11/584,466, 11/584,733, 11/584,725, 11/584,121, and 11/045,910 the content of which are incorporated by way of reference, thermal radiation sensors may be provided in a Wheatstone bridge configuration. Similar to other Wheatstone bridge arrangements, to function there must be a differential across the bridge. In this context, one side of the Wheatstone bridge is illuminated with infrared (IR) radiation while the other side is shielded from IR. As a result, a heat sensitive resistor on one side of the bridge is illuminated by the incoming radiation and the output of this side of the bridge maybe compared to its shielded pair to create an output voltage which is proportional to the difference in the resistance change between the illuminated and shielded resistors in each of the two branches.

Heat sensitivity resistors used in such arrangements are typically thermistors or bolometers having a resistance dependent on absolute temperature. Die temperature variations produce a very large signal compared to any sensed IR input. The use of reference resistors in a Wheatstone bridge configuration compensates for this effect. The effectiveness of this compensation is limited by the matching of TCR between all resistors in the bridge. However, even the best matching possible still leaves significant sensitivity to temperature variation in the underlying semiconductor substrate. Additionally, the thermal impedance between the thermal radiation sensor and the semiconductor die substrate may introduce a time constant to the sensor's response to die temperature change. In an environment where die temperature is changing this time constant introduces an error which cannot be corrected without analysis of the die temperature differential with respect to time.

SUMMARY

These and other problems are addressed by provision of a sensor device which addresses problems introduced by temperature gradients in the semiconductor substrate. Such a sensor device may be implemented by providing a thermal radiation sensor and a gradient sensor on a semiconductor substrate. The output of the gradient sensor may be used to calibrate the output of the thermal radiation sensor. Desirably by fabricating both the thermal radiation sensor and the gradient sensor in substantially the same fashion the use of these two sensors also provides an inherent compensation for rate of temperature drift.

These and other features will be better understood with reference to the followings Figures which are provided to assist in an understanding of the teaching of the invention.

BRIEF DESCRIPTION OF THE DRAWINGS

The present application will now be described with reference to the accompanying drawings in which.

DETAILED DESCRIPTION OF THE DRAWINGS

The invention will now be described with reference to some exemplary sensor devices thereof which are provided to assist in an understanding of the teaching of the invention.

Although the sensor devices described herein may have application in any electromagnetic (EM) radiation sensing environment, for the ease of explanation it will now be described with reference to a preferred illustrative embodiment, that of a silicon wafer-based thermal radiation sensor.

The present application addresses challenges such as those described above by providing a sensor device comprising a thermal radiation sensor and a gradient sensor. The output of the gradient sensor is used to calibrate for temperature gradient effects in the output of the thermal radiation sensor. The thermal radiation sensor provides an output signal indicative of the temperature increase caused by the incident radiation. The gradient sensor provides an output signal indicative of temperature gradient across the semiconductor substrate. This output signal may be used to compensate for any gradient effects affecting the output of the thermal radiation sensor. Ideally, both the thermal radiation sensor and the gradient sensor will share a common substrate although it will be understood that location on materials sharing thermal coefficient of resistance properties could suffice in that the gradient effects monitored by the gradient sensor will be representative of the gradient effects experienced by the thermal radiation sensor.

Figure 1:
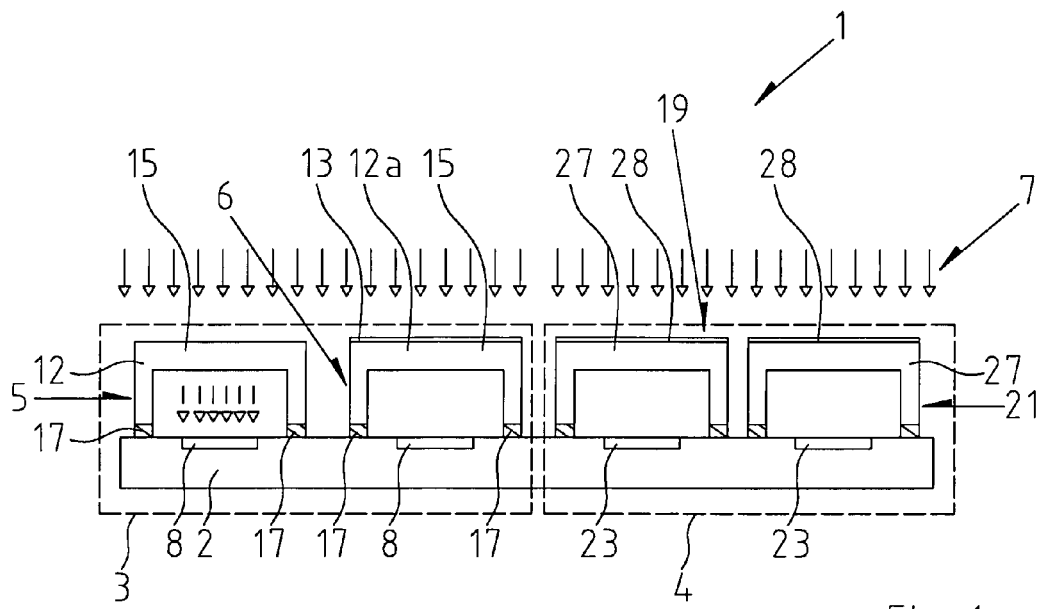
FIG. 1 is a front cross sectional view of a first embodiment of a sensor device with improved sensitivity to temperature variation in the semiconductor substrate.
Figures 2, 3:
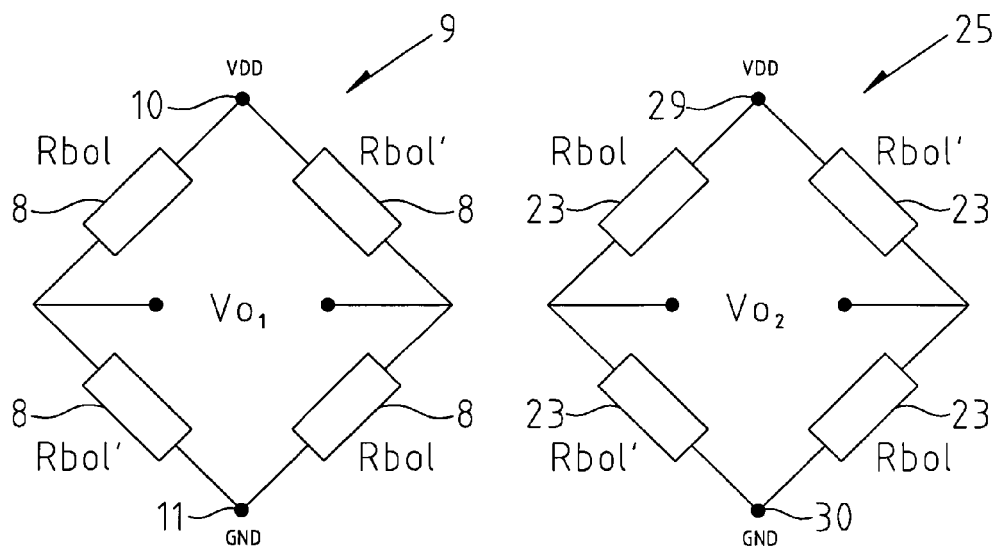
FIG. 2 is a circuit schematic diagram of a detail of the sensor device of FIG. 1.
FIG. 3 is another circuit schematic diagram of a detail of the sensor device of FIG. 1.
Figure 4:
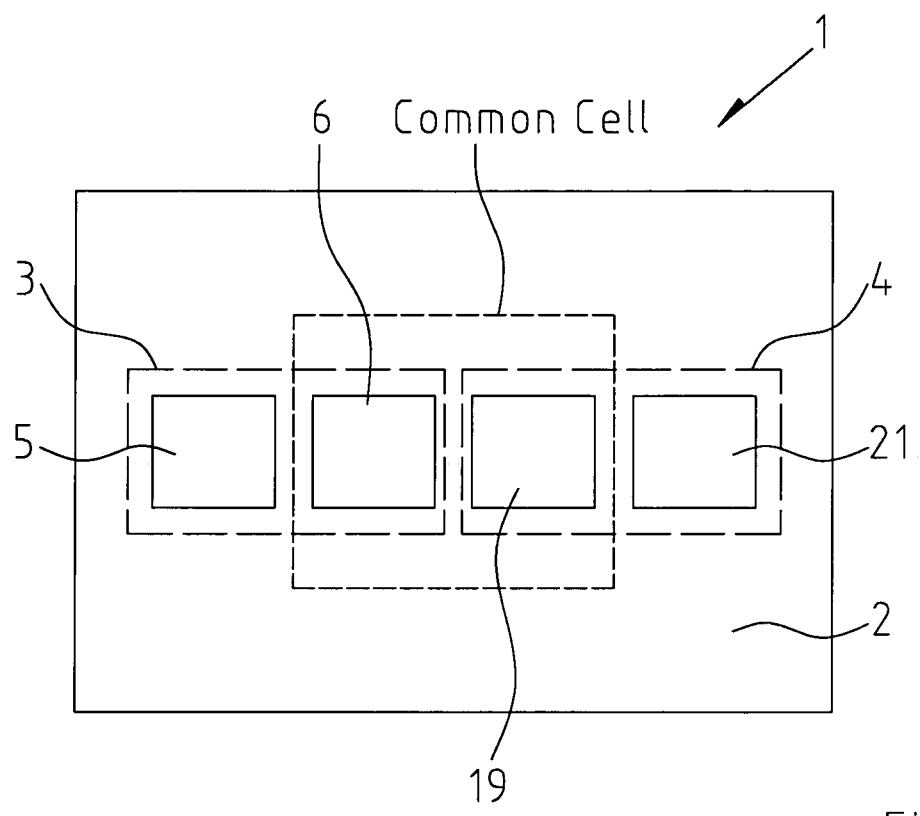
FIG. 4 is a plan view of the sensor device of FIG. 1.

Referring to the drawings and initially to FIGS. 1 and 4 there is illustrated an exemplary sensor device 1 fabricated on a semiconductor die substrate 2. The device 1 has a thermal radiation sensor 3 and a gradient sensor 4. Both the thermal radiation sensor 3 and the gradient sensor 4 are formed on the same substrate 2 and have substantially similar Temperature Coefficient of Resistance (TCR) such that the gradient effects experienced by the gradient sensor 4 will resemble that experienced by the thermal radiation sensor 3. In the exemplary arrangement of FIG. 1, the thermal radiation sensor 3 comprises a sensing cell 5 and a referencing cell 6 spatially separated from one another on the semiconductor substrate. The sensing cell 5 is provided for sensing infrared (IR) radiation 7 from an external incident infrared radiation source. The referencing cell 6 is shielded from the IR radiation 7 and provides an indication of the portion of the response that can be derived from the background environment. The sensing cell 5 and the referencing cell 6 each comprise a pair of thermally sensitive electrical elements, typically, bolometer resistors 8, as illustrated in FIG. 2. The bolometer resistors 8 are arranged in a first Wheatstone bridge configuration 9 with the two legs of the bridge being selectively provided in each of the sensing 5 and referencing 6 cells respectively.

The pair of bolometer resistors 8 (Rbol') provided within the sensing cell 5 are exposed to IR radiation 7, while the pair of bolometer resistors 8 (Rbol) provided within the referencing cell 6 are shielded from the IR radiation 7. A power supply $V_{DD}$ is applied to a first node 10 common to Rbol and Rbol' on one side of the bridge 9, and a ground signal $G_{ND}$ is applied to a second node 11 common to Rbol and Rbol' on the opposite side of the bridge 9.

In operation, the voltage across the resistors forming the legs of the bridge 9 are compared with one another to create a first output voltage signal $Vo_1$ which is proportional to the difference in the resistance change between illuminated (Rbol') and shielded (Rbol') bolometer resistors 8.

$$Vo_1 = V_{DD}[(Rbol - Rbol')/(Rbol + Rbol')] \quad (1)$$

And for $Rbol' = Rbol + dR_1$ $$(2)$$

$$dVo_1 \sim -V_{DD}[2dR_1/4Rbol] \quad (3)$$

As the impedance change between the sensing cell 5 and the referencing cell 6 is substantially caused by the incident IR radiation 7, the output voltage $Vo_1$ is indicative of the temperature increase caused by the IR radiation 7. The resistance of the illuminated resistors 8 (Rbol') increases in response to the temperature increase resulting from the incident IR radiation 7. This increase in resistance may be quantified by the change of resistance $dR_1$. The change in resistance $dR_1$ can be calculated using Equation 3 above as the change of voltage $dVo_1$ across the bridge may be derived from the voltage signal $Vo_1$ and the resistance values of the bolometer resistors 8 are known. The polarity of the voltage signal $Vo_1$ is, it will be appreciated, dependent on how the terminals of bridge 9 are connected. If the terminals of the bridge 9 are connected such that:

$$Vo_1 = V_{DD}[(Rbol' - Rbol)/(Rbol + Rbol')]$$

then $Vo_1$ is nominally positive. While the resistors 8 are described as being in a Wheatstone bridge configuration, it will be appreciated by those skilled in the art that this configuration is exemplary of the type of arrangement that could be used to quantify the portion of the output that is resultant or attributable to the incident IR radiation 7. For example, instead of a bridge configuration a pair of resistors in series may be used for quantifying the temperature increase from the incident IR radiation 7. In such a configuration, one of the resistors could be provided in the sensing cell 5 and the other resistor could be provided in the referencing cell 6. It will therefore be understood that it is not intended to limit the teaching of the present invention to any one specific configuration for providing the desired output signal.

To achieve the desired selective illumination/shielding of each of the sensing and referencing cells, a silicon cap 12, 12a may be provided over each of the sensing cell 5 and the referencing cell 6 respectively. Each of the caps 12, 12a serve to isolate the environment of the bolometer resistors 8 provided in each of the sensing and referencing cells from the ambient environment external to the thermal radiation sensor 3. In the context of a thermal radiation sensor 3 whose response is related to the incident IR radiation 7, it is desirable that the bolometer resistors 8 forming the sensing cell 5 are shielded from signals that are not related to incident infrared radiation. To provide the necessary shielding, it is desirable that the caps 12, 12a provided over the bolometer resistors 8 are substantially opaque to incident light in the visible spectrum. In this way incident radiation in the frequency range defined by the visible spectrum that is incident on the upper surfaces of the caps 12, 12a is prevented from passing through the caps and impinging onto the bolometer resistors 8 provided on the substrate below. In this context it will be appreciated that the properties of silicon that shield visible light and allow a transmission of light in the infrared frequencies of the EM spectrum make it a particularly useful material for forming the caps.

To achieve the necessary dark or shielded environment required for the referencing cell 6, it is desirable that no incident radiation irrespective of its wavelength may pass through the cap 12a and onto the bolometer resistors 8 provided within the referencing cell 6. To achieve this end, a reflective coating 13 may be provided on the upper surface of the silicon cap 12a located above the referencing cell 6. This ensures that the referencing cell 6 remains shielded while the sensing cell 5 is exposed to IR radiation 7. It will be understood that the provision of a reflective material on the upper surface is only one example of a way to achieve selective shielding of the environment within which the referencing bolometer resistors 8 operate. There are, it will be appreciated alternative techniques that could be used to effect this shielding. One example would be that instead of providing caps with reflective material, that the resistors in the referencing cell 6 could be coated with the reflected material.

To provide the necessary caps above each of the sensing and referencing cells it is possible to form each cap 12, 12a on a separate semiconductor die substrate 15 which is subsequently bonded to the first semiconductor die substrate 2 by a bonding adhesive 17. Further information on the fabrication of such devices is found in the previously mentioned co-assigned U.S. patent application Ser. No. 11/584,725, the content of which has been incorporated herein by way of reference. Once the caps 12, 12a are bonded to the substrate 2 the bonded arrangement may be encapsulated in an epoxy resin which is then cured for forming a plastic package. Alternatively, the caps 12, 12a and the substrate 2 can be packaged separately and bonded together after packaging.

In accordance with the teaching of the present invention in addition to the radiation sensor heretofore described a gradient sensor is also provided. Such a gradient sensor 4 is shown in FIG. 1 and similarly to the radiation sensor 3, comprises a pair of cells, namely, a first cell 19 and a second cell 21. The cells 19, 21 are spatially distinct such that each of the cells are responsive to temperature changes on different portions of the substrate 2. The spatial distance between the cells 19, 21 is desirably related to the spatial distance between the cells 5, 6 of the thermal radiation sensor 3 such that the gradient effects experienced by the gradient sensor 4 will resemble that experienced by the thermal radiation sensor 3. In a preferred arrangement the spatial separation between each of the cells forming the radiation sensor is the same spatial distance as that of the cells forming the gradient sensor.

In this exemplary arrangement each of the cells 19, 21 comprise a pair of thermally sensitive electrical elements, in this case, bolometer resistors 23, as illustrated in FIG. 3. It will be recalled that the bolometer resistors 8 of the radiation sensor were arranged in a first Wheatstone bridge and these bolometer resistors 23 of the gradient sensor are arranged in a second Wheatstone bridge configuration 25. In a similar fashion to that described above with reference to the radiation sensor, each of the cells 19, 21 forming the gradient sensor 4 include a pair of bolometer resistors 23. The pair of bolometer resistors 23 (Rbol') in the first cell 19 provide one half of the Wheatstone bridge 25, while the pair of bolometer resistors 23 (Rbol) in the second cell 21 provide the other half of the Wheatstone bridge 25. By fabricating the gradient sensor 4 with a first and second pair of bolometer resistors, each pair being formed in the semiconductor substrate, it will be understood that it is a substantially identical structure to the radiation sensor 3 and as such its inherent response characteristics are substantially identical to the radiation sensor. The gradient sensor does differ in this arrangement from the radiation sensor in that each of its first and second cells are shielded such that any differential response output by the Wheatstone bridge can be related to thermal gradient effects between each of the first and second cells.

While the cells 19, 21 are described as being separate from the cells 5, 6 of the thermal radiation sensor 3, it will be understood by those skilled in the art that instead of providing four cells three cells may be provided such that both the thermal radiation sensor 3 and the gradient sensor 4 share a common cell. For example, as illustrated in FIG. 4 the referencing cell 6 of the thermal radiation sensor 3 and the first cell 19 of the gradient sensor 4 could be provided by a single common shared cell. This common cell could be either the shielded or un-shielded cell as long as the other cell which forms the gradient cell is appropriately shielded or un-shielded respectively. Whereas the radiation sensor requires a shielded and un-shielded arrangement for operation, the gradient sensor requires two substantially identical cells such that the response difference between each of the two cells is linkable to gradient effects in the substrate where each of the cells are located. Desirably the gradient sensor is formed from two shielded cells.

To provide such shielding, silicon caps 27 which are substantially similar to the silicon caps 12,12a are located above the first cell 19 and the second cell 21 to isolate the environment of the first/second cells of the gradient sensor 4 from the ambient environment. However, in contrast to that described with reference to the thermal radiation sensor 3, in the gradient sensor 4 each of the two caps are shielded completely such that both the sets of bolometer resistors 23 are occluded from radiation in the visible and infrared spectra. To achieve this occlusion, a reflective coating 28 extends along the upper surface of both caps 27 which ensures that the complete Wheatstone bridge 25 is shielded from the IR radiation 7. In other words, the bridge 25 is shielded from IR radiation 7. A power supply $V_{DD}$ is applied to a third node 29 common to Rbol and Rbol' on one side of the bridge 25, and ground signal $G_{ND}$ is applied to a fourth node 30 common to Rbol and Rbol' on the opposite side of the bridge 25.

The bolometer resistors 23 on one side of the bridge 25 are effectively compared to bolometer resistors 23 on the opposite side of the bridge to create a second output voltage signal $Vo_2$ which is proportional to the difference in the resistance change between in the first cell 19 and the second cell 21.

$$Vo_2 = V_{DD}[(Rbol - Rbol')/(Rbol + Rbol')] \quad (4)$$

$$\text{And for } Rbol' = Rbol + dR_2 \quad (5)$$

$$dVo_2 \sim V_{DD}[2dR_2/4Rbol] \quad (6)$$

As the resistance change between in the first cell 19 and the second cell 21 is substantially caused by the temperature difference between the first cell 19 and the second cell 21 the second output signal $Vo_2$ is indicative of temperature variation in semiconductor substrate 2. This temperature difference between the first cell 19 and the second cell 21 may be quantified by the change of resistance $dR_2$. The change in resistance $dR_2$ can be calculated using Equation 6 above as the change of voltage $dVo_2$ across the bridge may be derived from the voltage signal $Vo_2$ and the resistance values of the bolometer resistors 23 are known. Therefore, the only unknown term in Equation 6 is $dR_2$. The polarity of the voltage signal $Vo_2$ is dependent on how the terminals of bridge 25 are connected. If the terminals of the bridge 25 are connected such that:

$$Vo_2 = V_{DD}[(Rbol' - Rbol)/(Rbol + Rbol')]$$

then $Vo_2$ is nominally positive.

The temperature increase caused by the incident IR radiation 7 may be derived from $Vo_1$ Equation 3. Die temperature variation in the substrate 2 may be derived from $Vo_2$ Equation 6. In accordance with the teaching of the invention, the variation in die temperature derived from $Vo_2$ may be used to effect a correction of the temperature value derived from $Vo_1$. The correction method may also use derivatives of the die temperature variation, i.e. rate of change of die temperature.

Bolometer resistors have a resistance value dependent on absolute temperature. Die temperature variations produce a very large signal compared to any sensed IR input. The use of reference resistors in a Wheatstone bridge configuration compensates for this effect. The effectiveness of this compensation is limited by matching the TCR between all resistors in the bridge. TCR matching limitations still leaves significant sensitivity to temperature variation in the underlying semiconductor substrate across the surface of the substrate—i.e. gradient effects. Additionally, the thermal impedance between the thermal radiation sensor and the semiconductor die substrate may introduce a time constant to the sensor's response to die temperature change, i.e. drift effects. As a result of the time constant and the temperature gradient in the substrate an error is provided in the output of thermal radiation sensors. This error in the output of thermal radiation sensors known heretofore cannot be corrected without analysis of the die temperature differential with respect to time. However, in accordance with the teaching of the present invention, the output $Vo_1$ of the thermal radiation sensor 3 can be calibrated without analyzing die temperature variation with respect to time by using the output signal $Vo_2$ of the gradient sensor 4. As the gradient sensor is formed from substantially identical components as those forming the radiation sensor, the output $Vo_2$ of the gradient sensor 4 incorporates the same time constant induced temperature errors as the output $Vo_1$ of the thermal radiation sensor 3. Thus, if $Vo_2$ is subtracted from $Vo_1$ these errors are eliminated.

It will be appreciated by those skilled in the art that it may be preferable to perform scaled subtraction. As shown in FIG. 8, a calibration module 40 may be provided on the semiconductor substrate 2 and is operable to read the output of the radiation $Vo_1$ and gradient sensors $Vo_2$ for calibrating $Vo_1$ using $Vo_2$. It will be appreciated that equivalently the calibration module 40, if provided, could be provided separately to the substrate on which the sensors are located.

Figure 5:
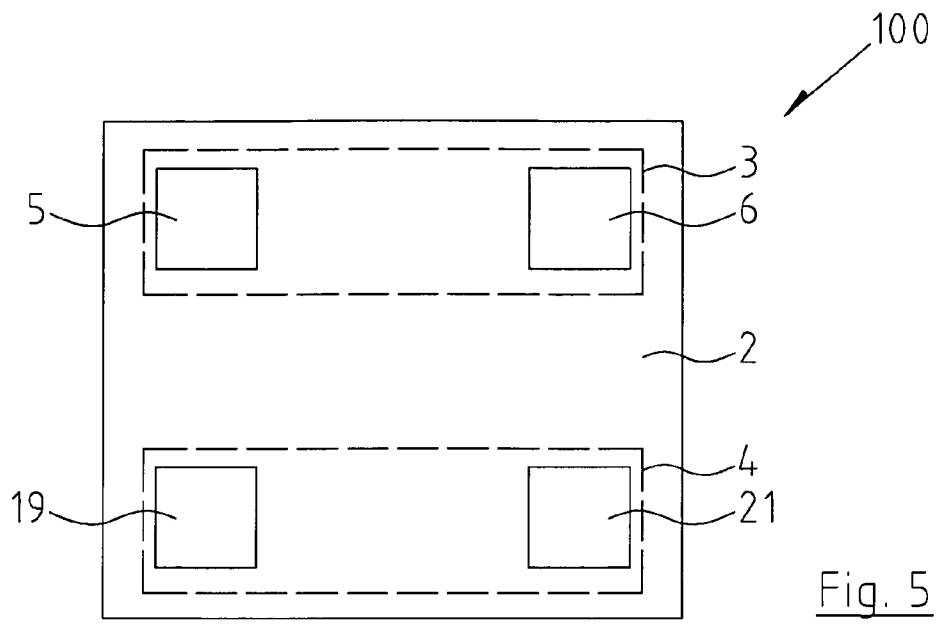
FIG. 5 is a plan view of another embodiment of a sensor device with improved sensitivity to temperature variation in the semiconductor substrate.

Referring now to FIG. 5 there is illustrated another sensor device 100 in a plan view. The sensor device 100 is substantially similar to the sensor device 1, and like components are identified by the same reference numerals. The main difference between the sensor device 1 and the sensor device 100 is that instead of locating the first thermal radiation sensor 3 and the second thermal radiation sensor 4 side by side as illustrated in FIG. 1 and FIG. 4, the first thermal radiation sensor 3 is located parallel to the second thermal radiation sensor 4. In this way it will be understood that the relative orientation of the two sensors to one another is not critical.

In this arrangement, the sensing cell 5 of the first thermal radiation sensor 3 is aligned with the first cell 19 of the second thermal radiation sensor 4. The referencing cell 6 of the first thermal radiation sensor 3 is aligned with the second cell 21 of the second thermal radiation sensor 4. The advantage of locating the gradient sensor 4 parallel to the thermal radiation sensor 3 is that it is easier to equate the spatial distance between the cells 19, 21 to the spatial distance between the cells 5, 6 of the thermal radiation sensor 3. In this way, the temperature gradient effects experienced by the gradient sensor 4 will resemble those experienced by the thermal radiation sensor 3. Otherwise, the operation of the sensor device 100 is substantially similar to the operation of the sensor device 1.

Figure 6A:
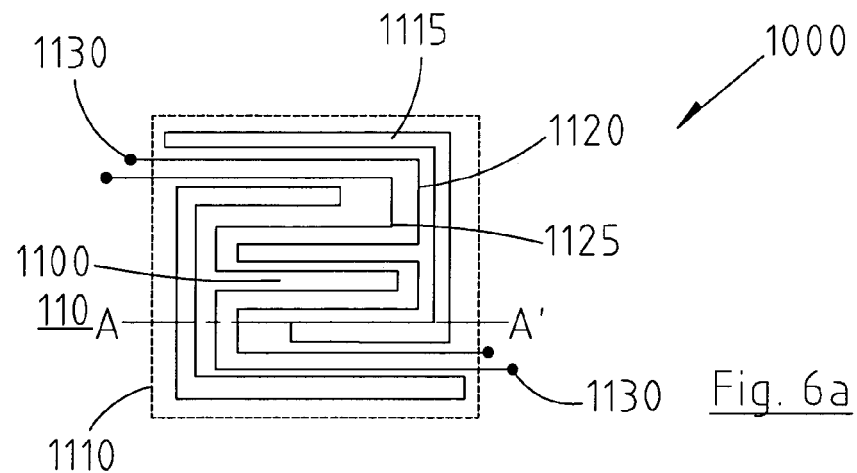
FIG. 6a is a plan view of another embodiment of a sensor device with improved sensitivity to temperature variation in the semiconductor substrate.
Figure 6B:
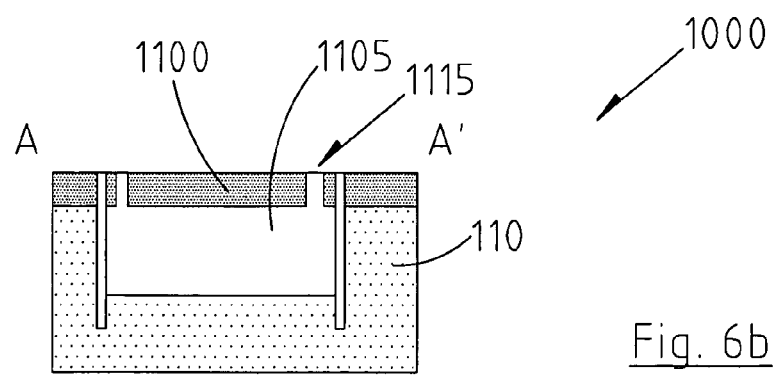
FIG. 6b is a cross sectional view of the sensor device of FIG. 6a, and FIG. 7 is a block diagram of the sensor device of FIG. 1 in communication with a calibration module.
Figure 7:
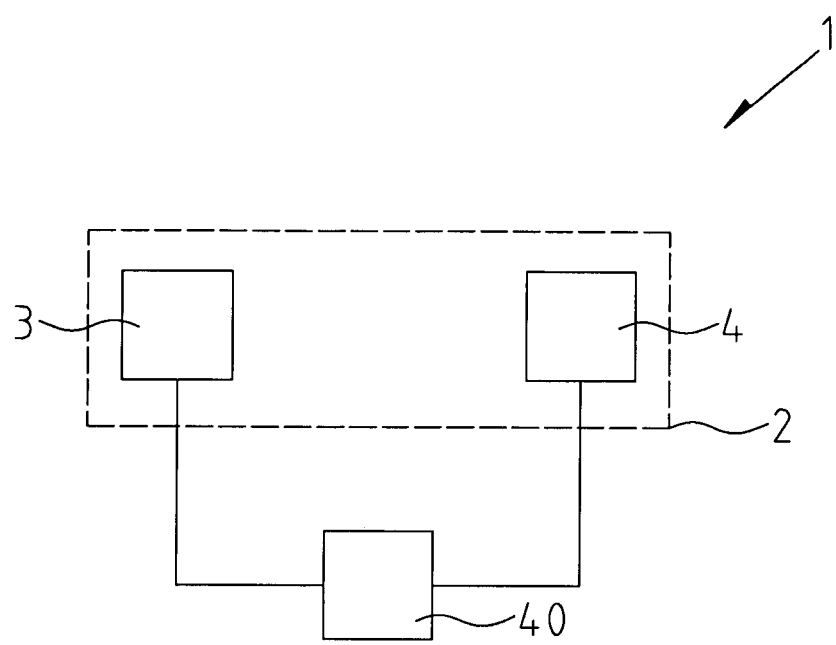

Referring now FIG. 6 there is illustrated another embodiment of a sensor device 1000. The sensor device 1000 is substantially similar to the sensor device 1. In the arrangement of FIG. 6, each pair of the two resistors that form the opposing legs of the Wheatstone bridges 9, 25 are co-located on corresponding platforms/tables thermally isolated from the substrate 2. For the ease of explanation the structure of one thermally isolated platform/table 1100 is described below. Such an arrangement is similar in construction to our co-assigned U.S. application Ser. No. 11/584,725 the content of which is incorporated herein by way of reference.

Such a thermally isolated platform/table 1100 may be formed by etching a cavity 1105 in the silicon substrate 110. The extent of the cavity 1105 may be defined by the use of trenches 1110 which can control the extent of the etch process. The cavity serves to insulate the platform/table 1100 from the substrate below. Slots 1115 are provided to insulate the platform/table from any thermal gradient in portions of the chip beside the platform/table. First 1120 and second 1125 resistors are provided on the platform/table, in this illustrated exemplary embodiment in a snake (S) configuration. It will be appreciated that the actual configuration of the resistors is not important, what is important is that the main portion of the fabricated resistor is provided on a thermally insulated platform/table. Each of the two resistors are provided with contact points 1130, to facilitate connection of the resistors to the remaining portions of the bridge.

It will be understood that in this embodiment while FIG. 6 shows the formation of a platform/table with two bridge resistors, i.e. one pairing of the Wheatstone bridge, that desirably each of the pairings of the bridge resistors are located on their own platform/table. In this way the formation of the bridge configuration will require two thermally isolated platforms/tables, each of which are desirably formed using micro electromechanical structure (MEMS) fabrication techniques. The two resistors on opposite legs of the Wheatstone bridge are co-located on the same platform/table so as to ensure they both see the same temperature change.

The heat sensitive resistors are characterized by having a known temperature coefficient of resistance (TCR), and will absorb heat from the incoming radiation if they are illuminated by it (a suitable absorbing layer is included in the construction of the resistors and platforms/tables). A variety of absorbing layers may be used including layers of silicon nitride, silicon dioxide, silver compounds and resistive compounds such as Titanium nitride, such as are well known in this field. Resistors provided as part of a sensing circuit in accordance with the teaching of the invention should be fabricated from materials that have a suitable thermal capacity such that the absorbed energy creates a sufficiently large temperature rise and then to maximize the available output signal for the given temperature rise. To ensure that there is a large temperature increase resultant from relatively little incident thermal energy it is important to keep the thermal capacity of the materials low. Additionally by keeping the thermal mass of the platform/table on which the thermal sensor is formed low ensures that the thermal sensor responds quickly to changes in temperature.

It will be understood that what has been described herein are illustrative diagrams provided in accordance with the teaching of the invention to assist in an understanding of the invention. Such exemplary arrangements are not to be construed as limiting the invention in any way, except as may be deemed necessary in the light of the appended claims. For example, while in one exemplary embodiment the second thermal radiation sensor has been described located parallel to the first thermal radiation sensor and in another exemplary embodiment the thermal radiation sensors are described as being located side by side it will be appreciated by those skilled in the art that the thermal radiation sensors may be located in any desired position on the substrate. One of the first and second cells of the second thermal radiation sensor may be located intermediate the sensing and referencing cells of the first thermal radiation sensor. Additionally, reflecting coating provided on the caps has been described as a method of shielding the bolometer resisters from the IR radiation. It will be appreciated by those skilled in the art that the bolometer resistors which require to be shielded from the IR radiation may themselves comprise a reflective coating instead of providing the reflective coating on the caps. Additionally, the second thermal radiation sensor has been described as comprising two caps one over the first cell and the other over the second cell. It will be appreciated that both caps may be replaced by a single cap, although of course it will be appreciated that if changes are made to the physical configuration or make up of the second sensor that are not made in the equivalent first sensor that these changes may effect the overall equivalence of the two sensors. By providing the first and second sensors with substantially the same physical dimensions and configurations, it is possible to calibrate the response of the first sensor. By using physically similar first and second sensors the calibration can be effected in an analog fashion as opposed to requiring off-chip calibration algorithms. It will be appreciated by those skilled in the art that calibration may also be effected in a digital fashion by implementing one or more correction algorithms. Components described with reference to one Figure may be interchanged with those of other circuits without departing from the spirit and scope of the invention.

The words comprises/comprising when used in this specification are to specify the presence of stated features, integers, steps or components but does not preclude the presence or addition of one or more other features, integers steps, components or groups thereof.

The invention claimed is:

1. An apparatus comprising a sensor device formed on a semiconductor substrate, the sensor device comprising:
   a thermal radiation sensor including an infrared radiation sensing cell and a first shielded infrared radiation referencing cell spatially separated from each other on the semiconductor substrate, the first shielded infrared radiation referencing cell and the infrared radiation sensing cell co-operating to provide a first output signal indicative of temperature fluctuations resulting from incident radiation, wherein the infrared radiation sensing cell is exposed to incident infrared radiation and the first shielded infrared radiation referencing cell is shielded from incident infrared radiation; and
   a gradient sensor including a second shielded infrared radiation referencing cell and at least one of the first shielded infrared radiation referencing cell or a third shielded infrared radiation referencing cell, wherein the gradient sensor is configured to provide a second output signal indicative of a temperature gradient experienced by the thermal radiation sensor, wherein the cells of the gradient sensor are shielded from incident infrared radiation,
   wherein the second output signal is operably combined with the first output signal to effect a calibration of the first output signal.

2. The apparatus as claimed in claim 1, wherein the gradient sensor includes the first shielded infrared radiation referencing cell and the second shielded infrared radiation referencing cell such that the thermal radiation sensor and the gradient sensor share a common cell.

3. The apparatus as claimed in claim 1, wherein the spatial distance between the cells of the gradient sensor is related to the spatial distance between the cells of the thermal radiation sensor such that the temperature gradient effects experienced by the gradient sensor are reflective of the temperature gradient effects experienced by the thermal radiation sensor.

4. The apparatus as claimed in claim 1, wherein the thermal sensor and the gradient sensor are formed on corresponding platforms of substantially similar thermal capacity and thermal mass such that the first and second outputs inherently compensate thermal drift effects, the platforms being thermally isolated from the substrate.

5. The apparatus as claimed in claim 1, wherein the thermal radiation sensor comprises at least one component with a Thermal Coefficient of Resistance (TCR) matched to the TCR of at least one component in the gradient sensor.

6. The apparatus as claimed in claim 1, wherein each cell of the gradient sensor comprises at least one thermally sensitive electrical element.

7. The apparatus as claimed in claim 6, wherein each cell of the gradient sensor comprises a pair of thermally sensitive electrical elements co-located therein.

8. The apparatus as claimed in claim 7, wherein the thermally sensitive electrical elements comprise resistive elements.

9. The apparatus as claimed in claim 7, wherein the thermally sensitive electrical elements of the gradient sensor are arranged in a bridge configuration.

10. The apparatus as claimed in claim 1, wherein the sensing cell and the referencing cell each comprises at least one thermally sensitive electrical element.

11. The apparatus as claimed in claim 10, wherein the sensing cell and the referencing cell each comprise a pair of thermally sensitive electrical elements.

12. The apparatus as claimed in claim 11, wherein the thermally sensitive electrical elements of the thermal radiation sensor are arranged in a bridge configuration.

13. The apparatus as claimed in claim 1, wherein the thermal radiation sensor comprises a plurality of thermally sensitive electrical elements arranged in a first Wheatstone bridge configuration, and the gradient sensor comprises a plurality of thermally sensitive electrical elements arranged in a second Wheatstone bridge configuration.

14. The apparatus as claimed in claim 1, wherein the thermal radiation sensor is located parallel to the gradient sensor, wherein the sensing cell is aligned with the first cell, and wherein the referencing cell is aligned with the second cell.

15. The apparatus as claimed in claim 4 wherein the first cell is located on a first platform of the corresponding platforms, and wherein the second cell is located on a second platform of the corresponding platforms.

16. The apparatus as claimed in claim 4 wherein the sensing cell of the thermal radiation sensor is located on a first platform of the corresponding platforms, and wherein the referencing cell of the thermal radiation sensor is located on a second platform of the corresponding platforms.

17. The apparatus as claimed in claim 1, further comprising an electric circuit incorporating the sensor device.

18. The apparatus as claimed in claim 1, wherein the infrared radiation sensing cell and the infrared radiation referencing cell form at least part of a first electrical circuit, and wherein the cells of the gradient sensor form at least part of a second electrical circuit separate from the first electrical circuit.

19. The apparatus as claimed in claim 1, wherein the cells of the thermal radiation sensor and the gradient sensor are substantially identical except for shielding present on the cells other than the infrared radiation sensing cell.

20. A sensor device formed on a semiconductor substrate, the device comprising:

a thermal radiation sensor including an infrared radiation sensing cell and a first shielded infrared radiation referencing cell configured to provide a first output signal indicative of temperature fluctuation resulting from incident radiation;

a gradient sensor responsive to temperature changes on different portions of the substrate, the gradient sensor including a pair of shielded infrared radiation referencing cells spatially separated from each other on the semiconductor substrate, wherein at least one of the pair of shielded infrared radiation referencing cells comprises a second shielded infrared radiation referencing cell, the pair of shielded infrared radiation referencing cells configured to provide a second output signal indicative of a temperature gradient experienced by the thermal radiation sensor for facilitating calibrating the first output signal; and a calibration module configured to read the first and second output signals for calibrating the first output signal using the second output signal; wherein said infrared radiation sensing cell is configured to be exposed to incident infrared radiation and said pair of shielded infrared radiation referencing cells are configured to be shielded from incident infrared radiation.

21. The sensor device as claimed in claim 20, wherein the pair of shielded infrared radiation referencing cells includes the first shielded infrared radiation referencing cell of the thermal radiation sensor such that the thermal radiation sensor and the gradient sensor share a common cell.

22. The sensor device as claimed in claim 20, wherein the infrared radiation sensing cell and the first shielded infrared radiation referencing cell form at least part of a first electrical circuit, and wherein the pair of shielded infrared radiation referencing cells of the gradient sensor form at least part of a second electrical circuit separate from the first electrical circuit.

23. The sensor device as claimed in claim 22, wherein the infrared radiation sensing cell comprises a first sensing resistor and a second sensing resistor, wherein the first shielded infrared radiation referencing cell comprises a first referencing resistor and a second referencing resistor, and wherein the first sensing resistor and the first referencing resistor are electrically coupled in series, and the second referencing resistor and the first sensing resistor are electrically coupled in series, to form a Wheatstone bridge circuit in the first electrical circuit.

24. The sensor device as claimed in claim 22, wherein one of the pair of cells comprises a first gradient sensing resistor and a second gradient sensing resistor, wherein the other of the pair of shielded infrared radiation referencing cells of the gradient sensor comprises a third gradient sensing resistor and a fourth gradient sensing resistor, and wherein the first gradient sensing resistor and the third gradient sensing resistor are electrically coupled in series, and the fourth gradient sensing resistor and the second gradient sensing resistor are electrically coupled in series, to form a Wheatstone bridge circuit in the second electrical circuit.

25. The sensor device as claimed in claim 20, wherein the cells of the thermal radiation sensor and the gradient sensor are substantially identical except for shielding present on the cells other than the infrared radiation sensing cell.

26. A method of calibrating a sensor device for incident radiation, the sensor device including a thermal radiation sensor and a gradient sensor formed on a semiconductor substrate, the gradient sensor being responsive to temperature changes on different portions of the substrate, the method comprises the steps of:

a. obtaining, from the thermal radiation sensor, a first output signal indicative of a temperature fluctuation resulting from an incident radiation, wherein the thermal radiation sensor includes an infrared radiation sensing cell and a first shielded infrared radiation referencing cell, wherein the infrared radiation sensing cell is exposed to incident radiation and the first shielded infrared radiation referencing cell is shielded from incident infrared radiation;

b. obtaining, from the gradient sensor, a second output signal indicative of a temperature gradient experienced by the thermal radiation sensor, wherein the gradient sensor includes a pair of shielded infrared radiation referencing cells at least one of which is different from the first shielded infrared radiation referencing cell, wherein the pair of shielded infrared radiation referencing cells are shielded from the incident infrared radiation; and c. calibrating the first output signal with the second output signal.

27. The method as claimed in claim 26, wherein the infrared radiation sensing cell and the infrared radiation referencing cell form at least part of a first electrical circuit, and wherein the pair of shielded infrared radiation referencing cells for the gradient sensor form at least part of a second electrical circuit separate from the first electrical circuit.

28. The method as claimed in claim 26, wherein the cells of the thermal radiation sensor and the gradient sensor are substantially identical except for shielding present on the cells other than the infrared radiation sensing cell.

* * * * *